(12) United States Patent
Richelson et al.

(10) Patent No.: US 11,030,598 B2
(45) Date of Patent: Jun. 8, 2021

(54) SYSTEM AND METHOD FOR REMOTE MANAGEMENT OF SALE TRANSACTION DATA

(71) Applicant: LIGHTSPEED COMMERCE USA, INC., New York, NY (US)

(72) Inventors: Jason Richelson, New York, NY (US); Jason Ordway, New York, NY (US)

(73) Assignee: Lightspeed Commerce USA Inc., New York, NY (US)

( * ) Notice: Subject to any disclaimer, the term of this patent is extended or adjusted under 35 U.S.C. 154(b) by 1219 days.

(21) Appl. No.: 14/747,828

(22) Filed: Jun. 23, 2015

(65) Prior Publication Data

US 2015/0294288 A1 Oct. 15, 2015

Related U.S. Application Data

(63) Continuation-in-part of application No. 13/037,048, filed on Feb. 28, 2011, now Pat. No. 9,317,844.

(60) Provisional application No. 62/015,938, filed on Jun. 23, 2014, provisional application No. 61/309,678, filed on Mar. 2, 2010.

(51) Int. Cl.
*G06Q 20/20* (2012.01)
*G06Q 20/32* (2012.01)

(52) U.S. Cl.
CPC ......... *G06Q 20/202* (2013.01); *G06Q 20/206* (2013.01); *G06Q 20/322* (2013.01)

(58) Field of Classification Search
None
See application file for complete search history.

(56) References Cited

U.S. PATENT DOCUMENTS

| | | | |
|---|---|---|---|
| 5,678,010 A | 10/1997 | Pittenger et al. | |
| 5,696,909 A | 12/1997 | Wallner | |
| D401,231 S | 11/1998 | Schechtman | |
| 5,903,873 A * | 5/1999 | Peterson | G06Q 40/08 705/4 |
| 6,002,395 A | 12/1999 | Wagner et al. | |
| 6,088,682 A | 7/2000 | Burke | |
| D436,580 S | 1/2001 | Navano | |
| 6,441,808 B1 | 8/2002 | Hashimoto | |
| 6,938,095 B2 | 8/2005 | Basturk et al. | |
| 7,171,370 B2 | 1/2007 | Burke | |

(Continued)

OTHER PUBLICATIONS

ShopKeep.com, 2010, pp. 1-3 https://web.archive.org/web/20110207094405/https://www.shopkeep.com/.*

(Continued)

*Primary Examiner* — Fateh M Obaid
(74) *Attorney, Agent, or Firm* — Sabety + associates, PLLC; Ted Sabety

(57) ABSTRACT

This invention discloses a novel system and method for providing retail point of sale terminals that are connected securely over the Internet to a back-office service that manages the retailer's data as a service using a system that supports more than one retailer, each of which will have one or more point of sale terminals. The system is adapted to provide a function to manage open checks that correspond to retail customers whose transactions are pending. The system is also adapted to permit service personnel to manage open checks by splitting them into multiple checks or merging multiple checks into one check.

14 Claims, 12 Drawing Sheets

(56) References Cited

U.S. PATENT DOCUMENTS

| | | | |
|---|---|---|---|
| 7,251,632 B1 | 7/2007 | Ogg et al. | |
| 7,353,181 B2 | 4/2008 | Musso | |
| 7,697,920 B1 | 4/2010 | McClain | |
| 8,090,402 B1* | 1/2012 | Fujisaki | H04M 1/575 |
| | | | 455/556.1 |
| 8,099,727 B2 | 1/2012 | Bahat | |
| D656,946 S | 4/2012 | Judy | |
| D657,368 S | 4/2012 | Magee | |
| 8,190,530 B2 | 5/2012 | Redmond et al. | |
| 8,195,656 B2 | 6/2012 | Grasset | |
| D667,838 S | 9/2012 | Magee | |
| D673,165 S | 12/2012 | Ospina Gonzalez | |
| D678,306 S | 3/2013 | Philopoulos | |
| D682,855 S | 5/2013 | Iden | |
| D689,086 S | 9/2013 | Philopoulos | |
| D690,721 S | 10/2013 | Tee | |
| 8,646,685 B2 | 2/2014 | Bishop | |
| 9,131,012 B2 | 9/2015 | Farias | |
| 9,270,585 B2 | 2/2016 | Manion et al. | |
| 9,317,844 B2 | 4/2016 | Richelson et al. | |
| 9,514,450 B2 | 12/2016 | Farias | |
| 9,799,034 B1* | 10/2017 | Varma | G06Q 20/327 |
| 2003/0101257 A1 | 5/2003 | Godwin | |
| 2003/0172127 A1* | 9/2003 | Northrup | G06Q 10/10 |
| | | | 709/219 |
| 2003/0212637 A1* | 11/2003 | Turner | G07F 19/201 |
| | | | 705/45 |
| 2003/0236755 A1 | 12/2003 | Dagelet | |
| 2004/0120333 A1 | 6/2004 | Geddes et al. | |
| 2004/0177004 A1 | 9/2004 | Mueller et al. | |
| 2004/0179224 A1* | 9/2004 | Kidokoro | H04N 1/2179 |
| | | | 358/1.14 |
| 2004/0181454 A1 | 9/2004 | Manno | |
| 2004/0254676 A1 | 12/2004 | Blust | |
| 2005/0021409 A1 | 1/2005 | Michaud et al. | |
| 2005/0234943 A1 | 10/2005 | Clarke | |
| 2006/0031237 A1 | 2/2006 | DeAnna | |
| 2006/0235755 A1 | 10/2006 | Mueller et al. | |
| 2006/0258337 A1 | 11/2006 | Fujita | |
| 2007/0015436 A1 | 1/2007 | Halstead | |
| 2007/0156436 A1 | 7/2007 | Fisher | |
| 2007/0276763 A1 | 11/2007 | Kleinman et al. | |
| 2008/0208696 A1* | 8/2008 | Olson | G06Q 20/20 |
| | | | 705/16 |
| 2008/0267116 A1 | 10/2008 | Kang et al. | |
| 2010/0106651 A1 | 4/2010 | Tate | |
| 2010/0125509 A1 | 5/2010 | Kranzley | |
| 2010/0191979 A1 | 7/2010 | Zipperer et al. | |
| 2010/0198728 A1 | 8/2010 | Aabye | |
| 2011/0125566 A1 | 5/2011 | McLaughlin et al. | |
| 2011/0218872 A1 | 9/2011 | Richelson et al. | |
| 2011/0225055 A1 | 9/2011 | Takahasi | |
| 2011/0231280 A1* | 9/2011 | Farah | G06Q 10/10 |
| | | | 705/26.8 |
| 2011/0246284 A1 | 10/2011 | Chaikin et al. | |
| 2011/0251892 A1 | 10/2011 | Laracey | |
| 2012/0054050 A1 | 3/2012 | Ziegler et al. | |
| 2012/0066363 A1 | 3/2012 | Somogyi | |
| 2012/0084135 A1 | 4/2012 | Nissan et al. | |
| 2012/0160912 A1 | 6/2012 | Laracey | |
| 2012/0191522 A1 | 7/2012 | McLaughlin et al. | |
| 2013/0232017 A1* | 9/2013 | Nathanel | G06Q 20/20 |
| | | | 705/16 |
| 2014/0097241 A1* | 4/2014 | Tovar | G06Q 20/3676 |
| | | | 235/380 |
| 2014/0244409 A1* | 8/2014 | Nathanel | G06Q 50/12 |
| | | | 705/15 |
| 2015/0199667 A1 | 7/2015 | Fernando et al. | |
| 2015/0339649 A1 | 11/2015 | Pi Farias | |

OTHER PUBLICATIONS

Mikhail T. Galeev titled "Catzhing the Z-Wave." Oct. 2, 2006. From Embedded.com (Website title: embedded cracking the code to systems.

\* cited by examiner

SYSTEM AND METHOD FOR REMOTE MANAGEMENT OF SALE TRANSACTION DATA

PRIORITY CLAIM AND INCORPORATION BY REFERENCE

This application claims priority as a nonprovisional continuation of U.S. Provisional Patent Application No. 62/015,938 filed on Jun. 23, 2014 and herein incorporates that application by reference in its entirety. This application claims priority as a continuation in part to U.S. patent application Ser. No. 13/037,048 filed on Feb. 28, 2011, which was a continuation of U.S. Provisional Patent Application No. 61/309,678 filed on Mar. 2, 2010 both of which are both herein incorporated by reference in their entireties.

FIELD OF INVENTION

This invention is related to point of sale systems typically used in retail stores. The invention is a novel architecture that permits a retail store owner to obtain sale transaction data management as a service instead of purchasing such a system and maintaining it.

BACKGROUND

In typical point of sale systems for retail stores, a set of special purpose computers are positioned at the retail checkout locations. These are locally networked with a server located at the site of the retail store. For many retail stores, this requires a level of system maintenance responsibility that is beyond the staff capabilities of the retailer or too costly. In this invention, the point of sale system is designed so that it is provided as a service shared among participating retail vendors. With this kind of an architecture, the invention provides the service security, data integrity, robustness and redundancy.

This invention relates to a system and method for executing sale transactions and managing the data associated with the transaction, for example, pricing and inventory. Typical point-of-sale systems have dedicated point of sale devices that are connected over a local area network to a local server computer dedicated to that specific vendor's system. Other systems use credit card readers that are connected by a wide are network to a system that clears the transaction, but the actual sale transaction data is managed using the dedicated system. In general, these dedicated systems are costly to buy and maintain. As a result, there is a need for a sale transaction data management system that can be shared by more than one vendor and offered as a service to these vendors, rather than a system that each vendor has to own and maintain.

One aspect of a point of sale system is that it must provide a flexible way for service personnel in certain contexts to manage the retail customer transactions that they are responsible for. The invention relates to managing retail customer's checks so that the person providing service to the customer can manage multiple customers and their order traffic efficiently and with ease.

DETAILED DESCRIPTION OF THE PREFERRED EMBODIMENTS

Figure 1:
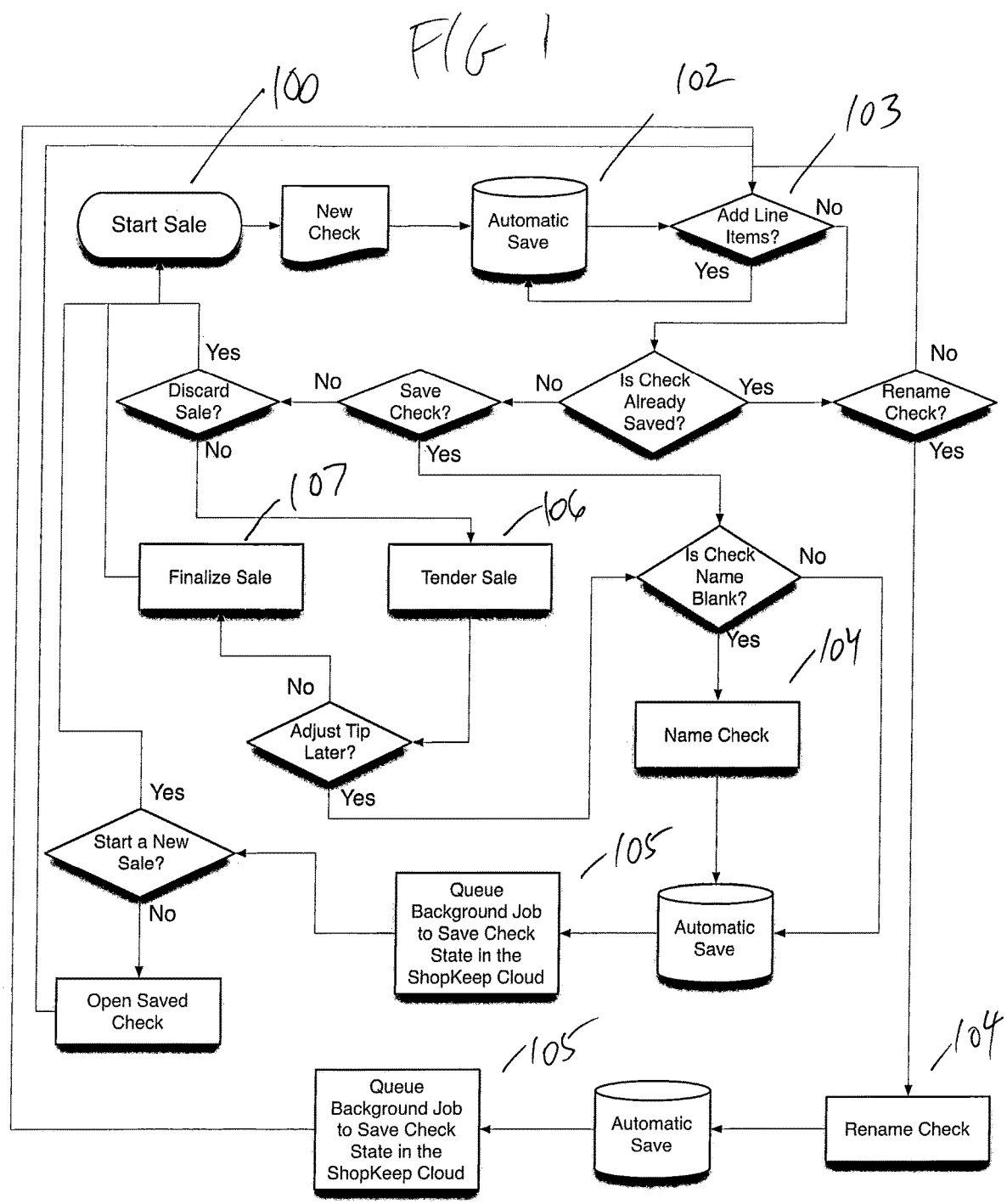
FIG. 1. Flow chart for processing open checks.

The typical embodiment of the system is centered around one or more servers that are hosted externally from the point of sale locations of the one or more vendors that use the system. Typically the servers are connected to the Register instances over a Wide Area Network, typically the Internet. A server is a computer containing or operatively connected, through a data network, one or more mass storage devices. The servers operate together as the repository of vendor information associated with the point of sale terminals. In the preferred embodiment, the terminals are typical personal computers operating an instance of the Register software. The servers are operatively connected to the point of sale terminals over a data network, a wide area network. In one embodiment, the Internet is the wide area network. The servers are accessed in several ways. The primary access is by means of the point of sale terminals. However, the servers are accessible from the Internet by other computers as well. The point of sale terminals is typically a personal computer running a typical operating system, for example, Windows™. In the preferred embodiment, a point of sale terminal is created by means of operating the Register software on a personal computer running Windows™.

Register Software Instance: Each computer at a point of sale location that acts as the transaction input interface or terminal is a typical personal computer running an instance of the point of sale software, or Register software. The Register software is designed to execute particular protocols that cause communication between the Register software instance and the servers. The protocol is designed to ensure that the Register software has access to that part of the database hosted by the servers associated with the vendor whose Register terminal is making the access. In this architecture, each Register instance communicates across the wide area network, including the Internet to the servers housing the database information associated with the vendor. In addition, the Register software is designed so that where a vendor has more than one terminal operating the Register software, the specific instance of Register that is accessing the server is identifiable by the database.

Once the Register software has been securely installed on a machine, the vendor personnel can use it to connect to their specific database operating on the server. An authorized vendor personnel is prompted to input the vendor identity, a user name and password to log in as the operator for the cash register station.

Once the Register instance has been initialized, the retail store personnel can use it to tally sales. The Register software presents a browser type interface with a user-customizable series of interactive screens that present the workflow typically used by that vendor. When a sale is made, the Register system looks in its local mass storage for the pricing associated with the unit sold.

At that point a transaction ticket is created, meaning a data object representing the transaction. That ticket contains a Register identifier, personnel identifier, item number, price and any other information the vendor has decided to associate with the transaction. The transaction ticket is transmitted to the server in conformance with the interactive protocol with the server.

When a transaction occurs on the Register, it pushes that information up to the back office server. The Register software contains several components that permit it to act as its own file server, database server and browser. The reason is that this provides simple robustness when the network connection over the WAN or Internet is down. The Register software maintains its own local database that mirrors the essential information present on the system server relevant to that Register license. When the system server is updated with new data for that vendor, where that Register instance is implicated, the server causes the database update to be transmitted down to the Register instance so that its database is updated. Likewise, the local database holds the transaction tickets. These are also transmitted to the system server when the network connection is re-established. As the transactions are processed by the system server, the status is updated both on the system server and the local Register software database. In one embodiment, the system does a data consistency check to be sure that the latest pricing and inventory data has been updated in the Register instance and that the latest transaction data in the Register has been updated in the back-office server database. When a work shift is opens on a given Register software instance, the Register software requests updates from back office system servers.

In yet another embodiment, the register instance can maintain more than one check. A check refers to a data structure representing one or more transaction items associated with a particular customer. In one example of the system, a check is created by the local register instance when the employee using the instance selects a command to create a new check. That check has a unique identifier associated with it so that the employee can create a second or multiple open checks. As each customer orders items to purchase, a reference to the items are added to the check data structure associated with that customer. Until a check has been paid for, that is, the check is processed for payment by the customer, the check status is that it is open. When the customer submits a credit card, cash or other payment mechanism, the check status is updated to be closed.

FIG. 1 shows a detailed flow chart that presents one embodiment of the invention. When the check is created, the sale begins (100). The data structure is automatically saved to the local disk (102). The employee can add items to the check (103). When that happens, the check is automatically saved to the local disk again. (102). When the check is first created (100), a default name is assigned to the check, for example "Walk in." The check can also be formally named to correspond to the customer (104). If this happens, the check is automatically saved. The purpose of the automatic saving is to be sure that the local storage of transaction data is on the local mass storage device in case of some kind of interruption. In addition, in certain places of the system logic, the automatically saved check data structure is queued for storage on the back-office server system. (105). This is an additional data security feature because it prevents loss of the local register instance resulting in loss of the open check data.

The open checks are queued for the back-office save in order to prioritize network traffic and servicing by the back-office server. The queuing process can use a variety of schemes. In one embodiment, the queue operates a last-in-first-out scheme, so that the oldest open check that has not been saved has highest priority to be transmitted of those in the queue. Other schemes weighting schemes may be used to calculate a relative priority based on the status of the open check. In this case, the system calculates a priority score as a weighting factor times a condition value. The queue is then ordered based on the decreasing value of the scores. For example, the priority can be correlated with the size of the pending amount due in a given open check. As a check gets substantial in value, it becomes more important that it be backed up on the back-office server. In this case, the priority value is equal to the open check's amount due times some predetermined constant. Another queuing scheme involves using the age of the check to increase its priority. In this case, the priority value is the age of the open check times some predetermined constant. The priority value can be equal to some combination of the above. For example, the queue position of an open check may be equal to the linear combination of the priority value based on the amount of the check with the priority value of the age. This way, a very large check can be placed before a moderately old check and vice versa.

At some point, the open check is presented, or tendered to the customer for payment. (106) The tender can involve printing a receipt for approval, transmitting to the user's mobile device a screen display where the customer can use the mobile device user interface to receive permission to process payment or any other method of presenting a list of items on the check and the total purchase price or amount due. When the customer processes payment, the check is finalized. (107). When a check is finalized, the open check data structure is transmitted up to the server system for storage on the back-end server system. This saving process is higher priority than the queued saving processes because it involves a completed transaction. Therefore, the queued saves wait for the finalized transactions to be transmitted to the back-office server.

Figure 6:
FIG. 6. Example screenshot of open check box icons with status display
FIG. 7. Example screenshot showing selection of open checks for transfer.
Figure 7:
Figure 8:
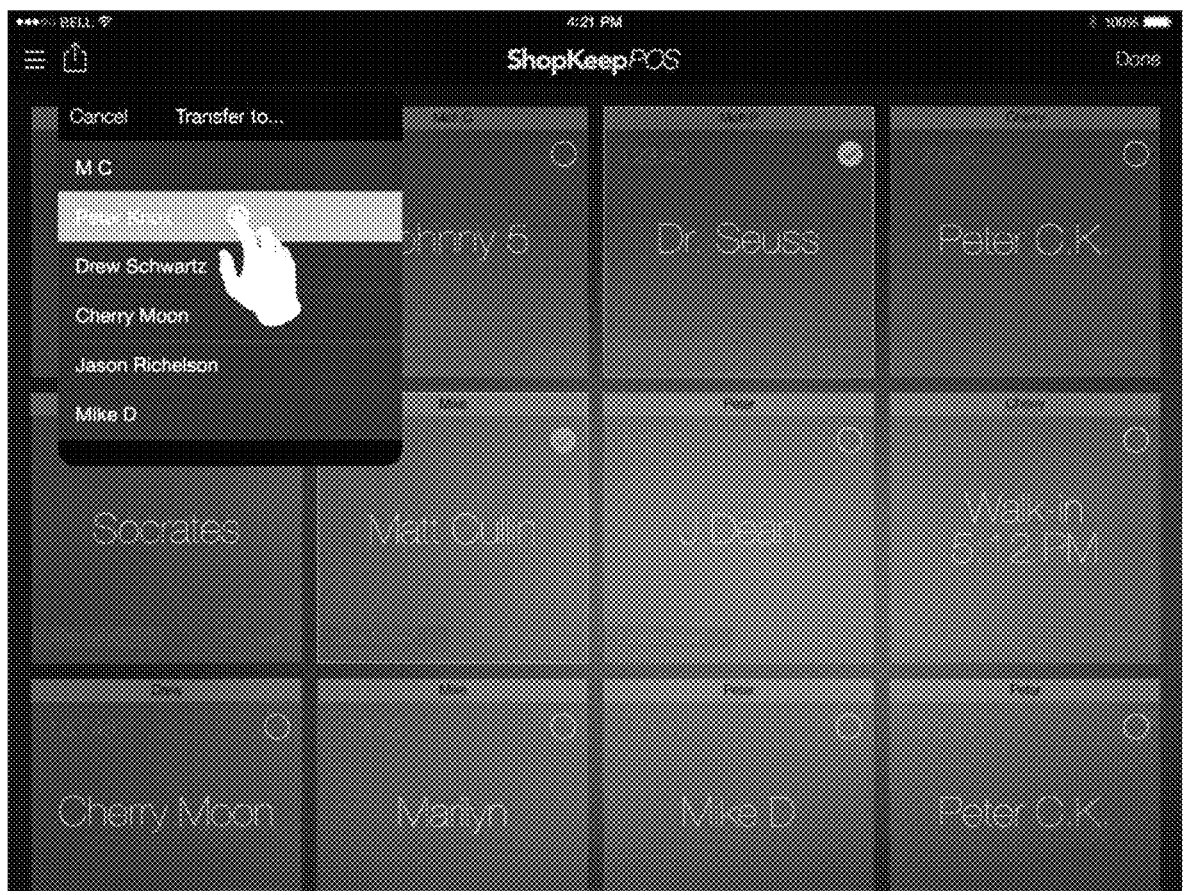
FIG. 8. Example screenshot showing selection of destination user for the transferred checks.

In yet another embodiment, the system manages the open checks while they are open. One management function is to pass an open check from one employee operating the register instance to another. This may occur when one employee is closing their shift, but the customer is still maintaining an open check. For this function, the first employee selects the open check by actuating the user interface of the first instance. FIG. 6. Then, the first employee enters a command to transfer the open check to another employee. FIG. 7. This may involve opening a menu item and selecting a predetermined name of a second employee who has logged into the register instance. When that selection has occurred, the system the automatically requests that the second employee verify that the selected open check be transferred to the second employee. FIG. 8. This is accomplished by the register instance presenting a user interface screen requesting a password from the second employee. The second employee then inputs the password. When the password is verified, the system then completes the transfer of the open check from the first employee to the second.

The transfer of an open check between employees can be accomplished by replacing the user-id that is part of or associated with the open check data structure stored on the local register instance (which would be the first employee's user-id) with the user-id of the second employee. This embodiment of the invention works where the two employees are logged into the same device or register instance. In another embodiment, each employee may have their own device with their own register instance. In this version of the invention, the device of the first employee transmits a data message embodying a request to the back-office that a transfer occur to the second employee. The back-office server logic is adapted to transmit a data message to the device operated by the second employee requesting the verification. When the second employee enters the verification data, either a local verification status or the data itself is transmitted up to the back-office server. The back-office server, conditioned on receiving such verification data, updates the data structure stored in the back office with the user-id of the second employee while transmitting the transferred open check data structure down to the second employee's device.

Figure 9:
FIG. 9. Example screenshot showing verification user interface.
Figure 10:
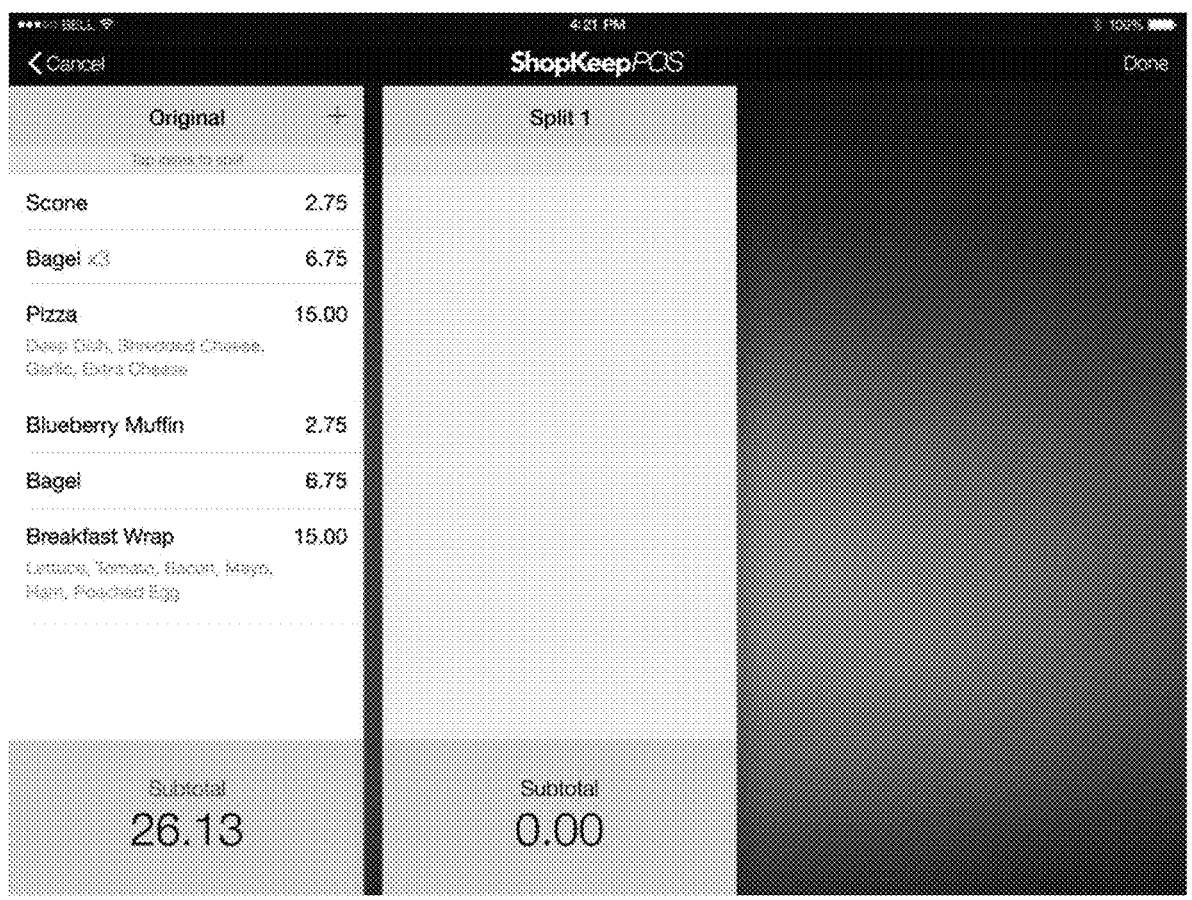
FIG. 10. Example screenshot showing creation of a new check for splitting.
Figure 11:
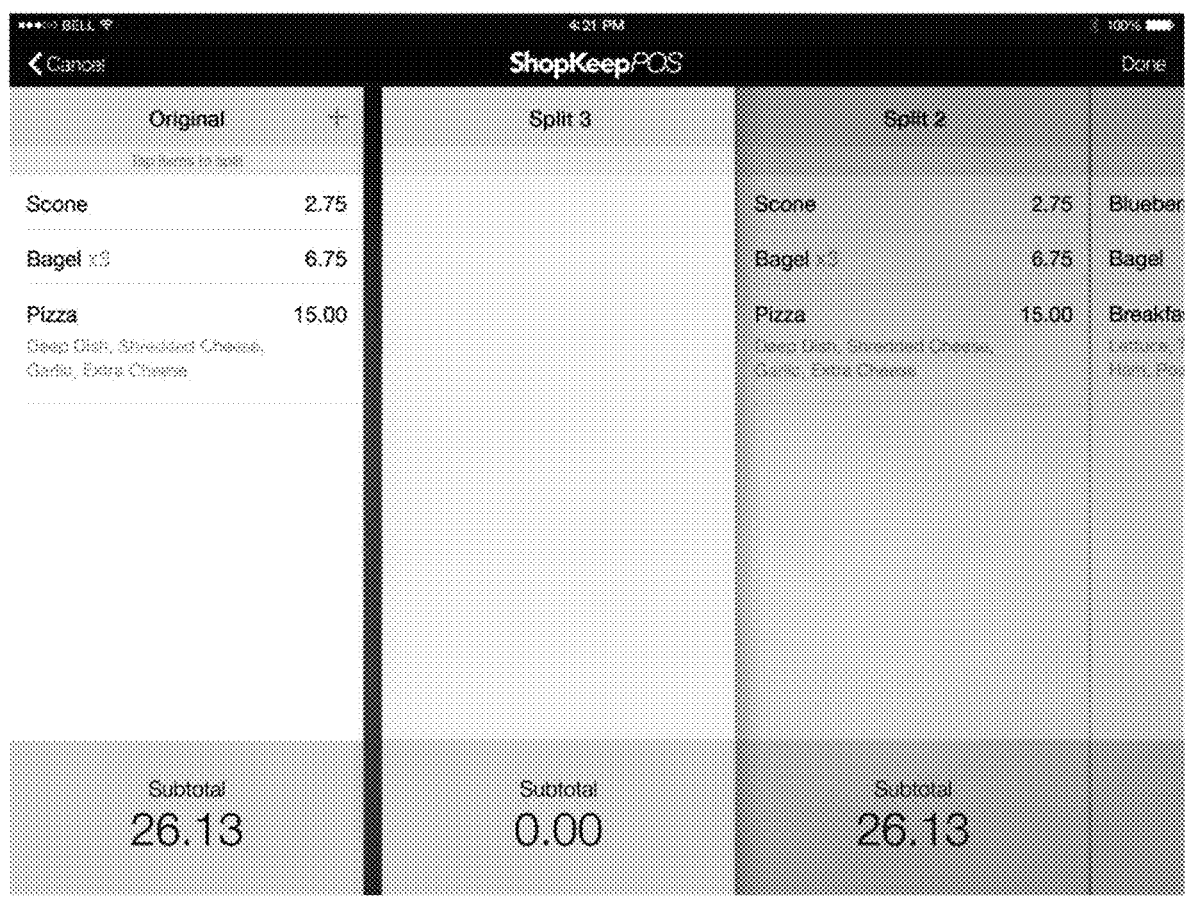
FIG. 11. Eample screenshot showing result of a split.
Figure 12:
FIG. 12. Example screenshot showing command input screen for saving a split check.

A second management function is to split an open check into two or more open checks. In this case, the employee operating register instance selects an open check using the user interface of the device. FIG. 9. The employee then can select a split command. This command may be selected more than once to automatically create one or more additional blank open checks. The employee can then select an item on the original open check and input a command to transfer that item from the original open check to one of the newly created open checks. When that transfer occurs, the item is deleted from the original open check. In this case, the data structure associated with the original open check is updated to delete the moved item, while the data structure of the new open check is updated to include the moved item. The employee can confirm saving the split. FIG. 11. When the two data structures are updated, they are automatically saved. In addition, any pending amount due for the bill is recalculated.

Figure 2:
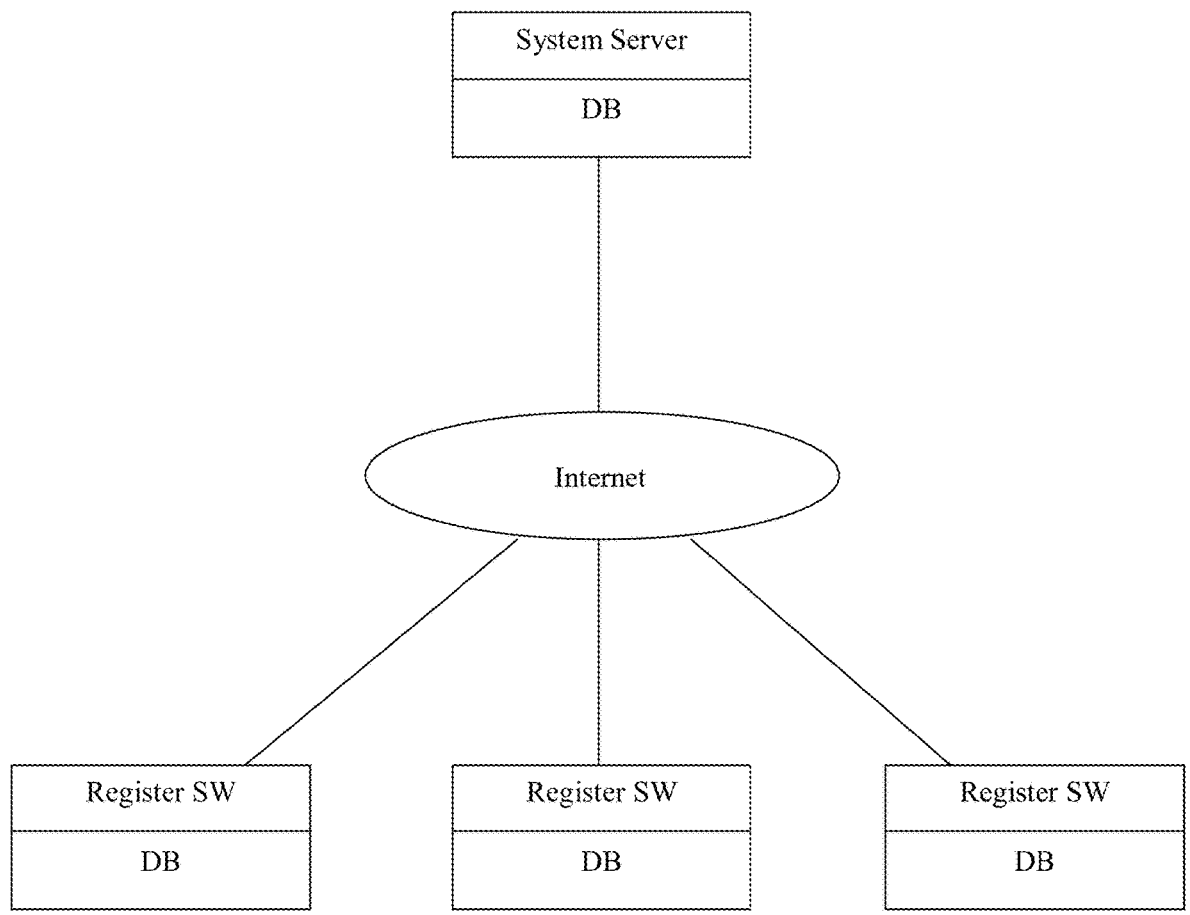
FIG. 2. Flowchart of system architecture/
FIG. 3. Example screenshot of open check box icons with status display
FIG. 4. Example screenshot for selecting check display detail
FIG. 5. Example screenshot showing open check detail for adding items to check.
Figure 3:
Figure 4:
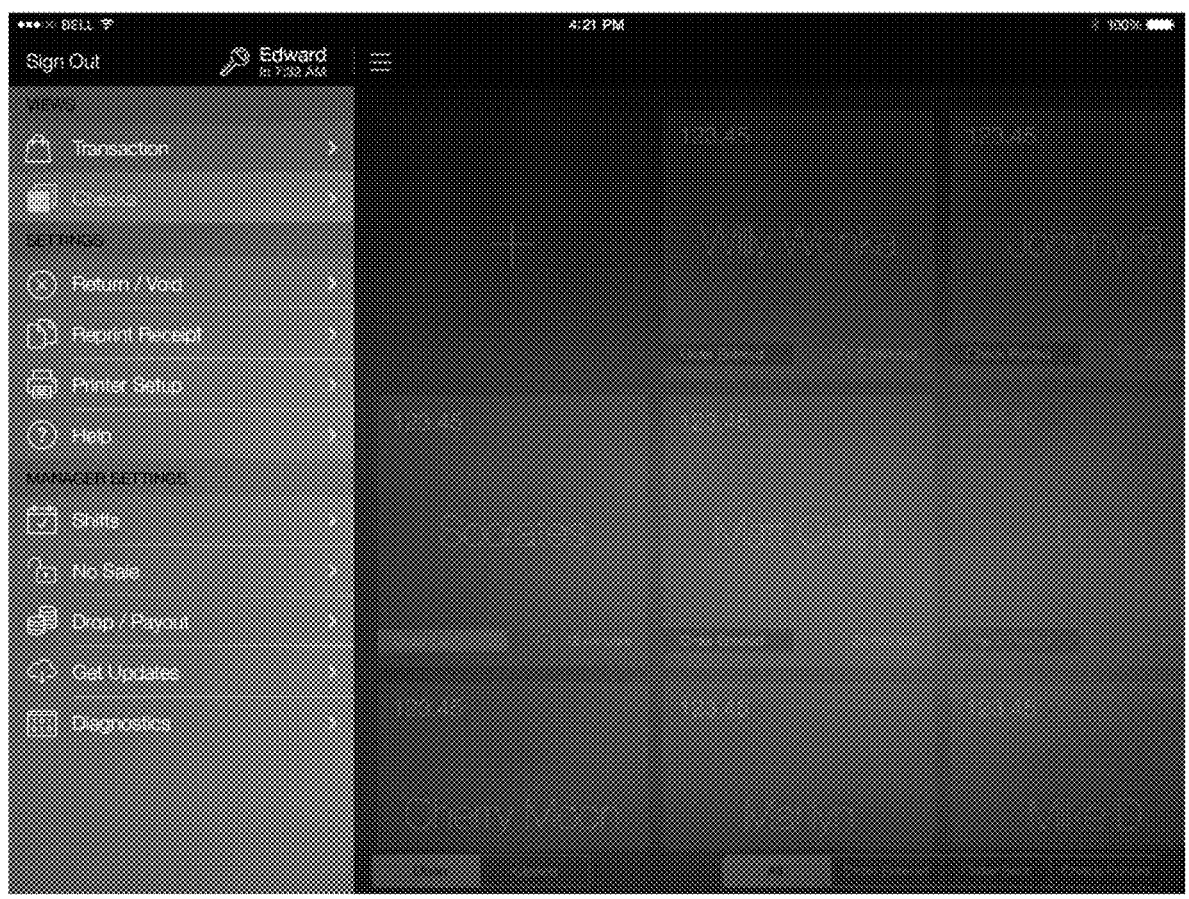
Figure 5:

In yet another embodiment, the system is adapted to present a user interface screen to the user that presents all of the pending checks and the status of their order. This may be as a result of the user inputting a command to cause that summary display. FIG. 3. For example, each order that an employee is managing at the register instance can be displayed as a graphical icon in the form of a box. FIG. 2, FIG. 5. These boxes can be lined up with the name of the customer in the box. In addition, graphical objects can be presented within the box that indicate the status of the order. The status may include "Open", "Order Entered", "Order Sent", "Check Printed", "Payment Pending". The data structure embodying the open check has an entry for that check's status. As the open check is used, that status is updated. For example, if the customer requests an item and it is entered into the system, the status is updated from "Open" to "Order Entered." When a fulfillment section of the business is delivering the item to the customer, the order is automatically updated to "Order Sent". When the open check is tendered to the customer, the status is updated to "Order Printed". When the payment information is entered into the system, the status is updated to "Payment Pending." When the payment transaction is completed, the open check is removed from the display list, although as a data item, it is saved on the back-office server. Once payment for a check has been processed, the user interface removes the icon for that check from the data structure that encodes the list of orders that are displayed on that management screen. The management screen can also act as a gateway to view or change the check. When the user selects one of the boxes representing an open check, for example, by actuating the user interface by a gesture in the location of the icon representing a check, the register instance switches user interface screens in order to display the detail of the items comprising the check. The screen may include an item selection menu. FIG. 4. In this state, the register instance is adapted to accept gestures and selections from the employee operating the system in order to add items to purchase to the selected open check.

A third management function is to merge two or more open checks together. In this embodiment, the register instance receives through its user interface a selection of at least two open checks. Then, the employee can select a merge command. This results in the creation of a new open check, but the items from the selected open checks are incorporated into its data structure. When this is complete, the selected open checks are deleted. In another embodiment of this invention, the selected open checks are presented in the user interface by listing the items on the checks in a series of columns, arranged so that more than one column, i.e., more than list comprising each open check, can appear at once in the screen. The register instance is then adapted to receive a selection of an item in one of the columns and to detect that the selection is being moved by a gesture input into the device's display unit, to a different column corresponding to a destination open check. When that selection and move process is completed, the two data structures of the source and destination open checks are updated to reflect that the item is removed from the source and added to the destination.

In the preferred embodiment, the data representing all of the checks and items are stored in a relational data base. In this manner, a number of data tables are created. Each item that is added to an open check has its own database key. Likewise, each check has its own database key. Therefore, there is a table of items, where there is one column for the open check that the item corresponds to. When an item is moved from one open check to another, the system actually updates the open check entry in the item table for the moved item to refer to the destination open check. Similarly, where the employee is transferring an open check to another employee, the table for the open checks has a column entry for the employee user-id. When the transfer occurs, the entry in the table for that open check is updated to be the second employee's user-id.

Operating Environment:

The Register software operates as a local web stack, or web application, but the application runs locally on the computer operated as the cash register. The computer operates a browser, which in the preferred embodiment, is a prism browser with limited functionality. The browser accesses localhost3000, which runs the Mongrel web server application. The web server operates various code modules that are Ajax™ and Java™ scripts. Also running locally is a local database, for example, HeidiSql or mySql. By arranging the local software components as Ajax and Java scripts accesses locally, the platform is device independent. In one additional embodiment, the web application constituting the Register software instance can run on a hand-held computer, like an iPhone™ or Blackberry™ or similar so-called smart-phone device.

The web server application also operates a background service that maintains interaction between the Register and the back office servers. When the Register processes a sale transaction, the background service is called to transmit the information to the back office computer. Likewise, when the back office updates its inventory or other variables relevant to the Register, the background service recognizes a request by the back office to update the data on the local computer and the updated is downloaded and stored.

In one embodiment, security is enhanced by encrypting the Ajax and Java script code. The installer program can take the unique numerical seeds derived from the hardware or some other password or user identifier to create a public/ private encryption key pair that it uses to encrypt the code modules. The encrypting key is then erased. The decryption key is used to decrypt the code as it is requested to be run. This module can be inserted into the web server application so that it operates as a operating system service, which has enhanced security features as well.

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention. Further, the user's computer may be a laptop or desktop type of personal computer. It can also be a cell phone, smart phone or other handheld device. The precise form factor of the user's computer does not limit the claimed invention. In one embodiment, the user's computer is omitted, and instead a separate computing functionality provided that works with the central server. This may be housed in the central server or operatively connected to it. In this case, an operator can take a telephone call from a customer and input into the computing system the customer's data in accordance with the disclosed method. Further, the customer may receive from and transmit data to the central server by means of the Internet, whereby the customer accesses an account using an Internet web-browser and browser displays an interactive web page operatively connected to the central server. The central server transmits and receives data in response to data and commands transmitted from the browser in response to the customer's actuation of the browser user interface.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting. It is appreciated that any of the software components of the present invention may, if desired, be implemented in ROM (read-only memory) form. The software components may, generally, be implemented in hardware, if desired, using conventional techniques.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

What is claimed:

1. A method for managing at least one open checks executed by a computer system comprising:
    displaying on a display screen comprising a first computer operating a first register instance at least one icon, each displayed icon corresponding to an at least one open check data structure that is associated with an identifier corresponding to the first register instance;
    receiving into the first register instance a selection data of at least one of the displayed open checks;
    displaying on the display screen comprising the first computer operating the first register instance an identifier icon associated with a second register instance operating on a second computer;
    transmitting to a server computer from the first register instance an at least one-identifier data associated with the second register instance;
    transmitting to the server computer an at least one identifier data that corresponds to the at least one of the selected open checks;
    updating at the server computer an at least one data structures corresponding to the at least one of the selected open checks to associate them with the identifier corresponding to the second register instance; and
    receiving at the second computer operating the second register instance data comprising at least one of the selected open checks whose data structures were updated to be associated with the second register instance.

2. The method of claim 1 further comprising:
    receiving an authentication token associated with the second register instance and confirming the token's validity as a condition to executing the updating step.

3. The method of claim 1 further comprising:
    receiving at least one identifier associated with an open check;
    receiving an identifier associated with the second register instance;
    updating at least one data structure corresponding to the at least one received identifiers to indicate that a user associated with the received identifier is associated with the at least one open checks.

4. The method of claim 1 where the identifier corresponding to the second register instance is a user-id and the updating step is comprised of replacing the user-id that is associated with the open check data structure stored on the server with the user-id associated with the second register instance.

5. The method of claim 1 where the identifier corresponding to the second register instance is a user-id and the updating step is comprised of changing the user-id entry in the row of a database table associated with the open check that is stored on the server to the user-id of the user associated with the second register instance.

6. The method of claim 1 further comprising:
displaying on the display screen of the first computer operating the first register instance data comprising the first open check data structure associated with the first register instance;
receiving a command for the displayed first open check to be converted into two open checks;
storing on the first register instance a data structure representing a new, second open check;
receiving a command for selection of at least one item displayed as part of the first open check;
storing into the second open check data structure references to the at least one selected items; and
deleting from the first open check data structure the references associated with the at least one selected items.

7. The method of claim 1 further comprising:
receiving through the first register instance user interface a selection of a first and a second open checks;
receiving through the first register instance user interface a command to merge the first and the second open checks;
storing on the first register instance a new, third open check data structure comprised of at least one data item associated with the first open check, and at least one data item associated with the second open check;
transmitting to the server computer a command indicating that the first and second checks are void;
transmitting to the server computer data comprising the third open check;
updating a database on the server to store the third open check; and
deactivating the first open check and the second open check.

8. A computer system for managing at least one open checks comprising:
a server computer;
a first computer comprising a computer readable storage medium comprised of program code that when executed by the first computer causes the first computer to:
operate as a first register instance and to display on a display screen comprising the first computer at least one icon, each displayed icon corresponding to at least one corresponding open check data structure stored on a server where each of the at least one open check data structures is comprised of a register instance identifier data that associates it with the first register instance;
receive into the first computer operating as the first register instance a selection of at least one of the displayed icons corresponding to the at least one open check data structures;
display on the display screen comprising the first computer operating as the first register instance at least one identifier icon associated with a second computer operating as a second register instance;
where the program code comprising the first computer further causes the first computer to transmit to the server computer a data identifier associated with the second register instance and transmit to the server data identifiers that correspond to the at least one selected open check data structures;
where the server computer is further comprised of a computer readable storage medium comprised of program code that when executed by the server computer causes the server computer to update at least one of the selected open check data structures by changing a corresponding at least one register instance identifiers comprising the selected open check data structures to refer to the identifier associated with the second register instance;
where the second computer is comprised a computer readable data storage medium comprised of program code that when executed causes the second computer operating as the second register instance to receive at least one data representing the at least one updated open check data structures.

9. The system of claim 8 where the server computer is further comprised of a computer readable storage medium comprised of computer readable program code that when executed by the server computer causes the server computer to receive an authentication token associated with the second register instance and confirm the token's validity as a condition to executing the updating step.

10. The system of claim 8 where the server computer is further comprised of a computer readable storage medium having computer readable program that when executed by the computer causes the server computer to:
receive at least one identifier associated with at least one of the open check data structures;
receive an identifier associated with the second register instance;
update at least one data structure corresponding to the at least one identifiers received from the second register instance to indicate that a user associated with the identifier received from the second register instance is associated with the at least one open check data structures.

11. The system of claim 8 where the identifier corresponding to the second register instance is a user-id and the server computer is further comprised of a computer readable storage medium comprised of program code that when executed causes the server to: replace the user-id that is associated with the open check data structure stored on the server with the user-id associated with the second register instance.

12. The system of claim 8 where the identifier corresponding to the second register instance is a user-id and the server computer is further comprised of a computer readable storage medium comprised of program code embodied in the medium comprising that when executed causes the server computer to change the user-id entry in the row of a database table associated with the open check that is stored on the server to the user-id of the user associated with the second register instance.

13. The system of claim 8:
where the computer readable storage medium comprising the first computer is further comprised of program code that when executed causes the first computer to display on the display screen of the first computer operating the first register instance data comprising a first open check data structure associated with the first register instance;
receive a command for the displayed first open check to be converted into two open checks;
store on the first register instance a data structure representing a new, second open check;

receive a command for selection of at least one item displayed as part of the first open check;

store into the stored data structure associated with the second open check, references to the at least one selected items; and delete from the first open check data structure the references associated with the at least one selected items.

14. The computer system of claim 8:

where the-computer readable storage medium comprising the first computer is further comprised of program code that when executed causes the first computer to:

receive through the first register instance user interface a selection of a first and a second open checks;

receive through the first register instance user interface a command to merge the first and the second open checks;

store on the first computer operating as the first register instance a new, third open check data structure comprised of at least one data item associated with the first open check, and at least one data item associated with the second open check;

transmit to the server computer a command indicating that the first and second checks are void;

transmit to the server computer data comprising the third open check; and where the computer readable medium comprising the server computer is further comprised of program code that when executed causes the server computer to:

update a database to store the third open check; and deactivate the first and second open check.

* * * * *